UNITED STATES PATENT OFFICE.

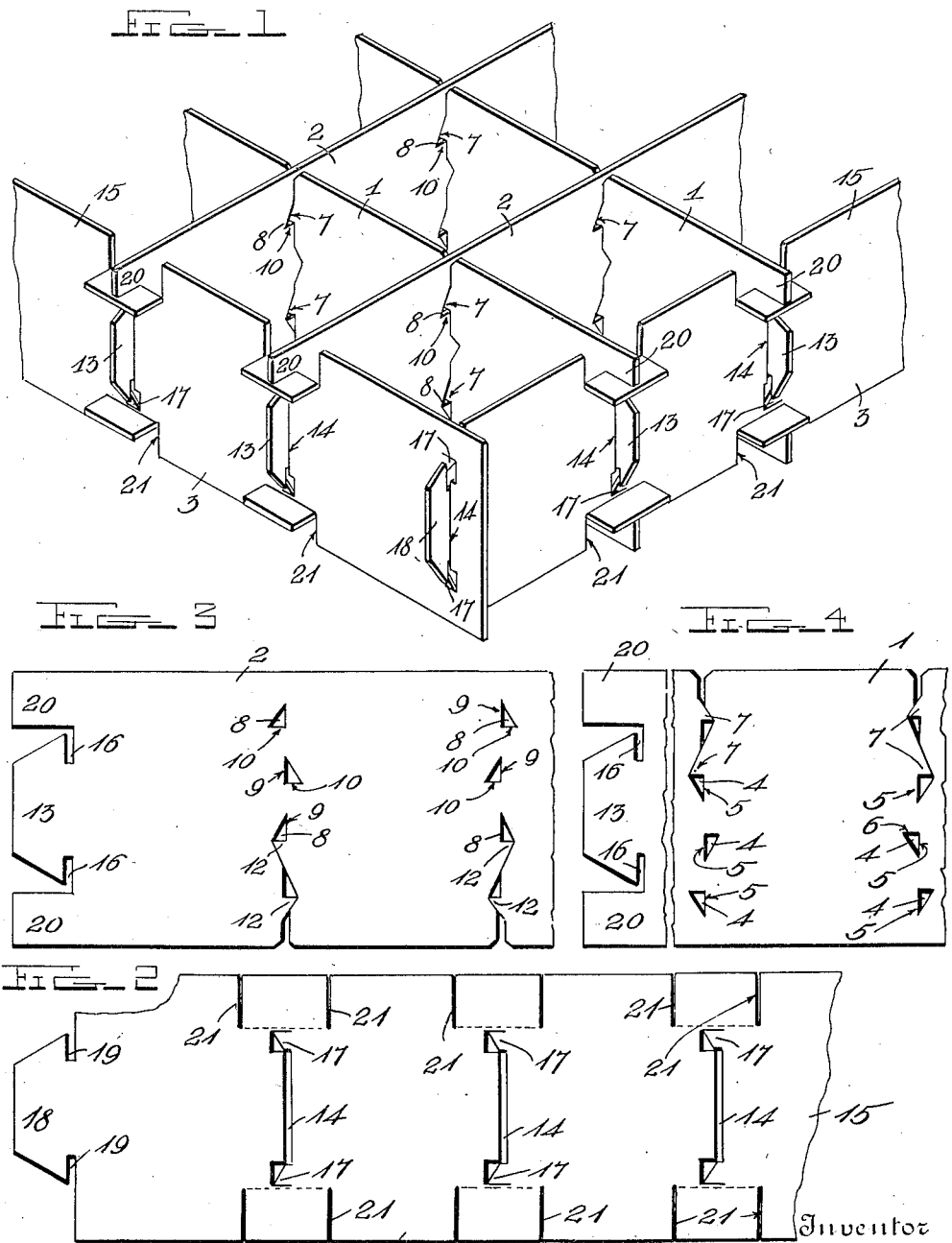

JAMES H. CARTER, OF CHICAGO, ILLINOIS.

FILLER FOR EGG-CRATES.

No. 882,049.

Specification of Letters Patent.

Patented March 17, 1908.

Application filed October 14, 1907. Serial No. 397,407.

*To all whom it may concern:*

Be it known that I, JAMES H. CARTER, a citizen of the United States, residing at Chicago, in the county of Cook and State of Illinois, have invented certain new and useful Improvements in Fillers for Egg-Crates; and I do declare the following to be full, clear, and exact description of the invention, such as will enable others skilled in the art to which it appertains to make and use the same.

This invention relates to improvements in fillers for egg crates.

The object of the invention is to provide an egg crate filler, the parts of which have formed therein my improved locking devices by means of which they are securely held together against casual disengagement.

With this object in view, the invention consists of certain novel features of construction, combination and arrangement of parts as will be more fully described and particularly pointed out in the appended claims.

In the accompanying drawings, Figure 1 is a perspective view of one corner of a filler constructed in accordance with the invention; Fig. 2 is a side view of one of the outside cross strips of the filler; Fig. 3 is a similar view of one of the intermediate cross strips which run in one direction; and Fig. 4 is a similar view of one of the intermediate cross strips which run in the opposite direction at right-angles to the strips shown in Fig. 3.

In the embodiment of the invention I provide a series of strips 1 formed of pasteboard or similar material, and adapted to form two sides of the egg cells. The strips 1 are crossed by a second series of strips 2, which are similar in construction to the strips 1 and form the two opposite sides of the egg cells. The outer ends of the strips 1 and 2 are connected by outer strips 3, which in turn are connected together at their meeting ends to form the outer walls of the corner egg cells of the filler.

Each of the strips 1 are provided at suitable intervals with vertical rows of triangular perforations 4, which extend upwardly from the lower edges of the strips to a point slightly above the centers of the same. The perforations 4 are arranged in the strips so that one of the right-angular walls, 5, thereof will be in line with each other, while the other right-angular walls, 6, of each alternate perforation projects at right-angles in the opposite direction. Above the row of perforations 4, the strips 1 are cut to form a zig-zag series of locking tongues 7. The zig-zag cut which forms the tongue 7 is continuous from the upper perforation 4 to the upper edge of the strip.

The strips 2 run at right angles to the strips 1 and are also provided with a series of vertically disposed triangularly shaped perforations 8, said rows being spaced apart at suitable intervals. The perforations 8 in the strips 2 extend downwardly from the upper edge of the strips and have their vertical walls 9 arranged in alinement, while the horizontal walls 10 of each alternate perforation projects in opposite directions at right-angles to the vertical walls. Below the row of perforations 8 is formed a zig-zag cut which extends continuously from the lower perforation 8 to the lower edge of the strip and forms a series of angularly shaped locking tongues, 12.

The arrangement of the perforations 8 and the locking tongues 12 in the strip 2 is exactly opposite to the arrangement of the perforations 4 and locking tongue 7 of the strip 1, so that when said strips are brought together to form the cells of the filler, the cut portions of said strips are slipped together or into engagement, after which the locking tongues in the upper portion of the strip 1 will engage with the perforations in the upper portion of the strips 2, and in like manner the locking tongues in the lower portion of the strip 2 will spring into engagement with the perforations 4 in the lower portion of the strip 1, thus providing for a locked engagement between the oppositely disposed intermediate cross strips of the filler, which will prevent the casual disengagement or separation of said strips.

The outer opposite ends of the strips 1 and 2 are provided with dovetail-shaped locking heads or projections 13, which are adapted to be engaged with locking slots, 14, formed in outer filler strips 15, which are arranged around the outer sides or edges of the filler and form the outer wall of the outer row of egg cells. The locking heads 13 on the ends of the strips 1 and 2 are notched inwardly to form locking recesses, 16, while the slots 14 in the outer strips 15 are cut at their opposite ends to form angularly shaped locking tongues, 17, which are adapted to engage the locking notches 16 in the heads 13 of the strips 1 and 2, when said heads are engaged with the slots 14 in said outer strips 15.

The outer ends of two outer oppositely disposed strips 15 have formed thereon dovetail-shaped locking heads 18, in which are formed locking notches 19, said heads 17 being adapted to be engaged with the end slots 14 in the opposite ends of the other two outer strips 15 at each corner of the filler, the tongues 17 of said outer slots being engaged with the notches 19 in the head 18, thereby securely locking the ends of the outer strips 15, together and forming the outer walls of the corner egg cells.

The ends of each of the strips 1 and 2 project above and below the heads 13 to form protecting lugs 20, said lugs being adapted to project over the upper and lower edges of the outer strips 15, said strips being cut inwardly on each side of the point which is engaged by the lugs 20, as shown at 21, said material between the cuts 21 being adapted to be bent outwardly at right-angles to the strip to permit the engagement of the lugs 20 with the latter. The lugs 20 together with the outwardly bent cut portions of the strips 15 form protecting lugs for the locking heads 13 and prevent said heads from coming into engagement with the inner sides of the crate when the fillers are placed therein.

Having thus described my invention, I claim:—

1. In an egg crate filler, a series of intermediate cell strips arranged at right-angles to each other to form egg cells, said strips having vertical rows of locking apertures arranged at intervals, a series of locking tongues arranged in line with each of said rows of apertures, said tongues being formed by zig-zag cuts extending from the inner end of each row of locking apertures to the opposite edge of the strip, locking heads formed on the ends of said intermediate cell strips, outer cell strips arranged around the edges of the filler, said strips having formed therein locking slits to receive the heads on the ends of the intermediate strips, and means on said outer cell strips to protect the locking heads on said intermediate strips, substantially as described.

2. In an egg crate filler, a series of intermediate cell strips arranged at right-angles to each other to form egg cells, said strips having vertical rows of locking apertures arranged at intervals, a series of locking tongues arranged in line with each of said rows of apertures, said tongues being formed by zig-zag cuts extending from the inner end of each row of locking apertures to the opposite edge of the strip, locking heads formed on said intermediate cell strips, said heads having locking notches formed therein, outer cell strips arranged around the edges of the filler, said strips having a series of vertically disposed slots formed therein to receive the heads on the intermediate cell strips, locking tongues formed at the ends of said slots to engage the notches in the locking heads of said intermediate strips, locking heads formed on the opposite ends of two of said outer cell strips to engage the outer end slots of the other two outer strips, thereby forming the corner cells of the filler, and means on said outer cell strips to protect the locking heads on said intermediate cell strips, substantially as described.

3. In an egg crate filler, a series of intermediate cell strips arranged at right-angles to each other to form intermediate egg cells, said strips having vertical rows of locking apertures arranged at intervals, a series of locking tongues arranged in line with each of said rows of apertures, said tongues being formed by zig-zag cuts extending from the inner ends of each row of apertures to the opposite edge of the strip, locking heads formed on the ends of said intermediate cell strips, protecting lugs formed on the ends of said strip above and below said locking heads, outer cell strips arranged around the edges of the filler, said strips having formed therein locking slits to receive the heads on the ends of the intermediate strips, and laterally projecting pieces formed on said outer strips and held in position by said lugs to protect the locking heads on said intermediate strips, substantially as described.

In testimony whereof I have hereunto set my hand in presence of two subscribing witnesses.

JAMES H. CARTER.

Witnesses:
J. A. STEWART,
J. N. SPETH.